United States Patent [19]

LaBrouche et al.

[11] Patent Number: 5,222,866
[45] Date of Patent: Jun. 29, 1993

[54] HIGH SPEED COMPOSITE TURBINE WHEEL

[75] Inventors: Jean-Pierre LaBrouche, Merignac; Bernard Broquere; Jean-Marie Parenteau, both of Bordeaux; Jacques Etienne, le Taillan Medoc; Alain Lacombe, Pessac, all of France

[73] Assignee: Societe Europeenne de Propulsion, Suresnes, France

[21] Appl. No.: 912,019

[22] Filed: Jul. 10, 1992

Related U.S. Application Data

[63] Continuation of Ser. No. 412,790, Sep. 26, 1989, abandoned.

[30] Foreign Application Priority Data

Sep. 30, 1988 [FR] France .................. 88 12853

[51] Int. Cl.⁵ .................................. F01D 5/34
[52] U.S. Cl. ..................... 416/230; 416/241 A; 416/244 A
[58] Field of Search ............ 415/200; 416/241 R, 416/241 A, 229 R, 229 A, 230, 244 A, 244 R; 29/889.7, 889.71

[56] References Cited

U.S. PATENT DOCUMENTS

| | | | |
|---|---|---|---|
| 1,567,574 | 12/1925 | Clay | 416/230 |
| 1,875,597 | 9/1932 | Heath | 416/230 |
| 2,202,013 | 5/1940 | Lougheed | 416/230 |
| 2,485,827 | 10/1949 | Hartzell | 416/230 |
| 3,679,324 | 7/1972 | Stargardter | 416/230 |
| 4,354,804 | 10/1982 | Cruzen | 416/230 |
| 4,412,784 | 11/1983 | Wackerle et al. | 416/230 |
| 4,465,434 | 8/1984 | Rourk | 416/230 |
| 4,676,722 | 6/1987 | Marchal et al. | 416/230 |
| 4,751,123 | 6/1988 | Broquere et al. | 416/230 |

FOREIGN PATENT DOCUMENTS

| | | |
|---|---|---|
| 690087 | 11/1966 | Belgium . |
| 0176386 | 8/1985 | European Pat. Off. . |
| 1810915 | 11/1968 | Fed. Rep. of Germany . |
| 1426846 | 4/1969 | Fed. Rep. of Germany . |
| 2401888 | 9/1977 | France . |
| 2476766 | 10/1980 | France . |
| 2117844 | 4/1982 | United Kingdom . |

Primary Examiner—Edward K. Look
Assistant Examiner—Hoang Nguyen
Attorney, Agent, or Firm—Weingarten, Schurgin, Gagnebin & Hayes

[57] ABSTRACT

The wheel comprises a central portion, or rim provided with blades at its peripheral portion and is made of a single piece of composite material formed by a fibrous reinforcement densified by a matrix. The fibrous reinforcement is formed from a helical fabric with radially oriented fibers and circumferentially oriented fibers. The density of fibers in a radial direction and the density of fibers in a circumferential direction varies along a radius of the wheel as a function of the variations of the radial stresses and circumferential stresses that are exerted on the wheel when it is in operation. At least part of the circumferentially oriented fibers in the rim are made of a material having high mechanical resistance, while at least part of circumferentially oriented fibers in the blades and at least part of the axially oriented fibers are made of a material having good resistance to high temperatures and chemical attacks.

6 Claims, 3 Drawing Sheets

HIGH SPEED COMPOSITE TURBINE WHEEL

This application is a continuation of application Ser. No. 07/412,790, filed Sep. 26, 1989, abandoned.

BACKGROUND OF THE INVENTION

The present invention relates to a composite material wheel intended for high-speed operation, in particular for use in an aeronautical engine. Here, the term high-speed is understood to mean linear peripheral speeds in excess of 500 m/s.

It has already been proposed, e.g. in document FR-A-2,476 766, to produce a one-piece composite turbine wheel comprising a central portion, or rim, fitted with peripheral blades. The composite material consists of a fibrous reinforcement densified by a matrix, with the orientation of the reinforcing fibers determined as a function of the stresses exerted on the wheel when in operation.

SUMMARY OF THE INVENTION

The object of the present invention is to provide a turbine wheel of the above type but having significantly improved performance, both mechanically and as regards resistance to high temperatures and chemical attacks.

The object is achieved according to the present invention by the fact that said fibrous reinforcement is formed by means of a helical fabric with radially oriented fibers and circumferentially oriented fibers, the density of fibers in a radial direction and the density of fibers in a circumferential direction varying along a radius of said wheel as a function of the variation in radial stresses and of the variation in circumferential stresses, respectively, that are exerted on said wheel when said wheel is in operation, and at least part of said circumferentially oriented fibers in said rim are made of a material having substantial mechanical resistance, such as carbon, while at least part of said circumferentially oriented fibers in said blades and said radially oriented fibers are made of a material having substantial resistance to high temperatures and chemical attacks, such as silicon carbide.

The combination of a fiber density that is graded in both a radial direction and a circumferential direction as a function of the stresses exerted in the wheel, with a selection of fiber materials having specific properties adapted to different parts of the wheel, makes it possible to produce a turbine wheel that can withstand high stresses while having good longevity, even in a chemically and thermally aggressive environment.

BRIEF DESCRIPTION OF THE DRAWINGS

The invention shall be more clearly understood from the following description, given as a non-limiting example, with reference to the attached drawings in which:

FIG. 1 shows a turbine wheel 10 comprising, in a classic way, a rim 12 in the form of an annular disk whose central portion forms a hub 14, and blades distributed around the periphery of the rim.

Figure 2:
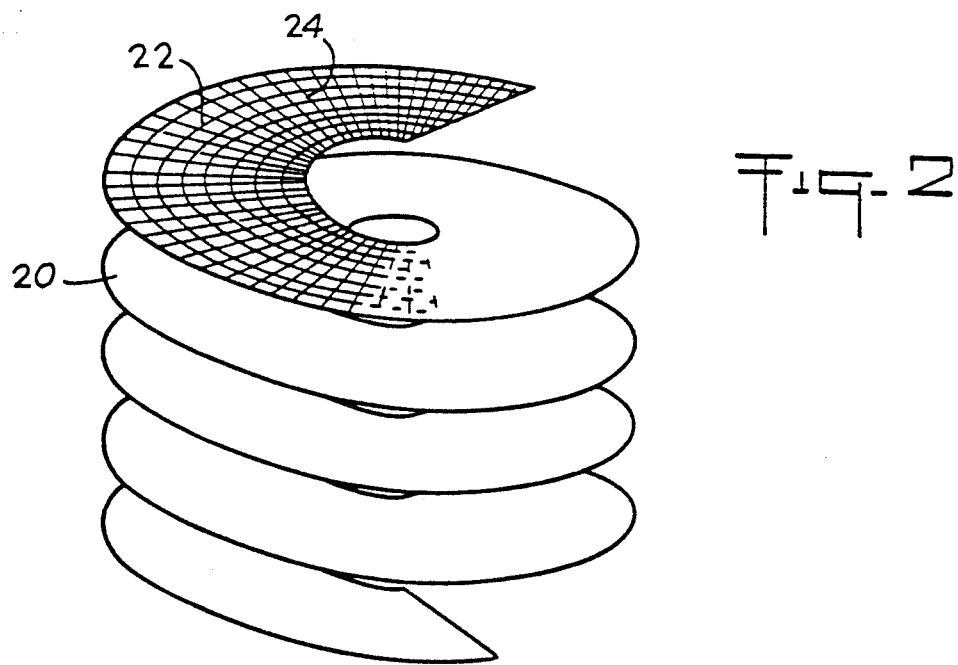
FIG. 2 is a schematic view of a length of helical fabric used for forming the fibrous reinforcement of the composite material constituting the turbine wheel according to the invention.

In accordance with the invention, the wheel is made from a single piece of composite material whose fibrous reinforcement is obtained by means of a helical fabric, as shown in FIG. 2.

Helical fabrics and their manufacturing processes are well known in the art. In the illustrated example, the fabric 20 is made of warp threads 22 oriented in the circumferential direction and weft threads 24 oriented in the radial direction. The density of warp threads from one edge of the fabric to the other can be decreased or increased by spreading or bunching the threads. The density of weft threads from one edge of the fabric to the other, i.e. along a radius, can also be varied by inserting the weft threads over all or part of the warp, not necessarily staring from the edge of the latter.

A preform of the wheel is obtained by tightening together the spirals of the helical fabric, whose number and fiber density correspond to the thickness required for the preform, as shown in FIG. 2. The outer diameter of the preform is deliberately made greater than that of the finished wheel, inclusive of the blades, to account for the reduction in dimensions resulting from the final machining operation.

According to the invention, the densities of circumferentially oriented fibers and radially oriented fibers vary with the radius so as to be adapted to the stresses exerted on the wheel during its operation.

Figure 1:
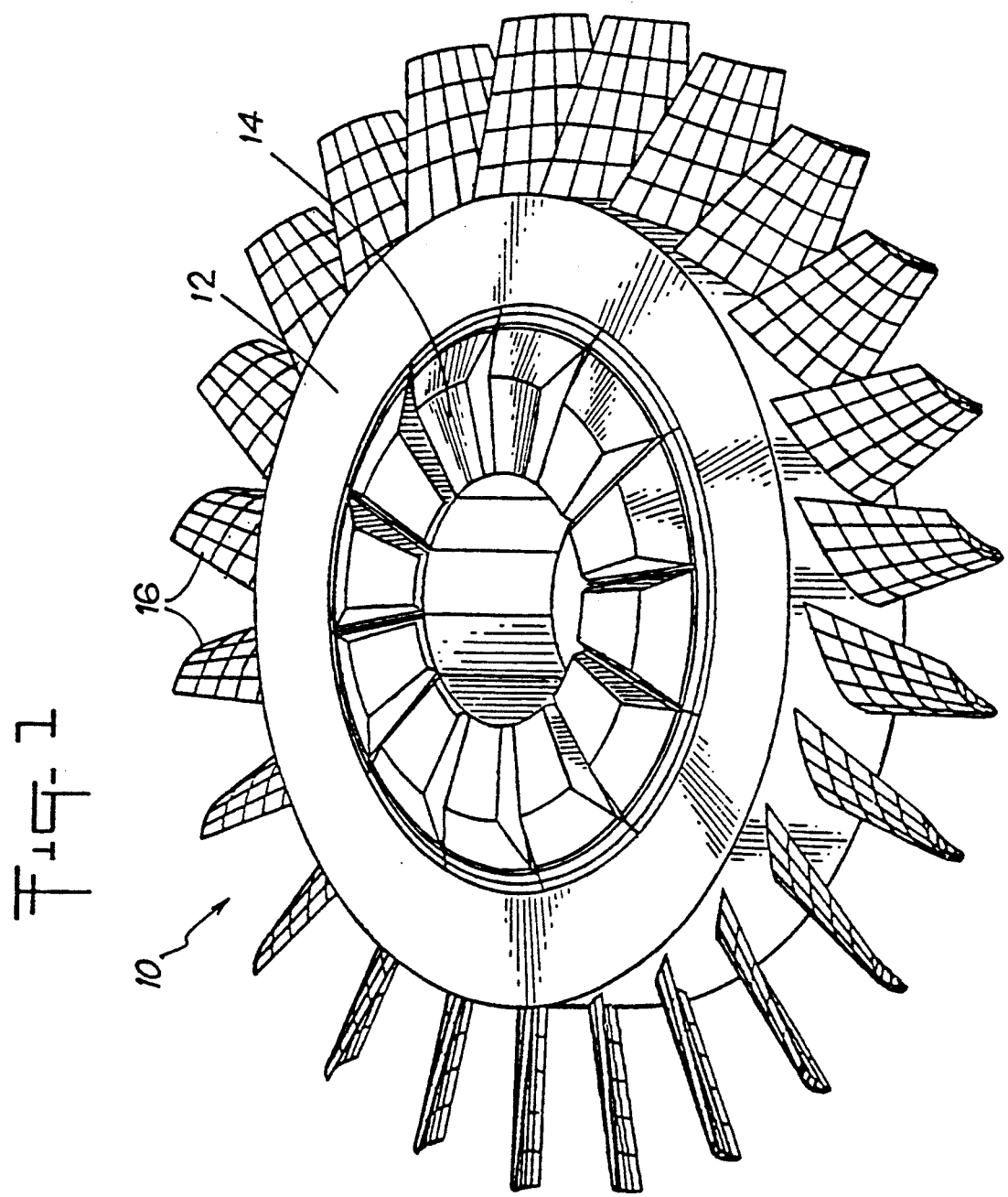
FIG. 1 is a three-quarter view of a turbine wheel.
Figure 3:
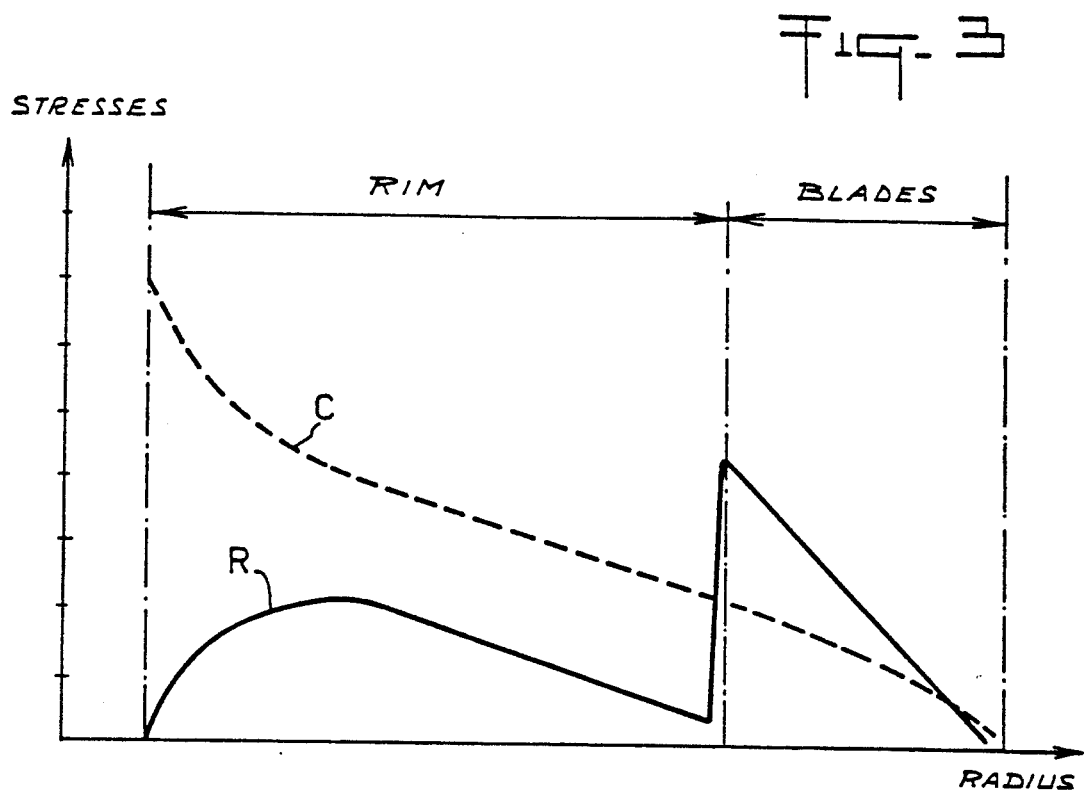
FIG. 3 shows the variations in circumferential and radial stresses as a function of the wheel diameter.

FIG. 3 shows the variations in circumferential and radial stresses in a turbine wheel made of linearly elastic isotropic material, such as that shown in FIG. 1, having an internal diameter of 33 mm, an external diameter of 220 mm (including blades) and an external rim diameter of 155 mm.

As shown by curve C in FIG. 3, the circumferential stresses decrease along the radius, starting from the inner radius of the rim, with a stronger decrease in the section forming the hub.

In contrast, curve R in FIG. 3 shows that radial stresses increase from the inner radius of the rim, in the section forming the hub, and thereafter decrease up to the external radius of the rim. A large and abrupt increase in radial stresses is observed at the blade roots, beyond which radial stresses steadily decrease when going to the external radius of the wheel.

The use of a composite material consisting of a refractory ceramic fiber (such as carbon, silicon carbide, alumina, alumina-silica, etc. . . . ) and a ceramic or refractory matrix such as silicon carbide, makes it possible to considerably reduce the calculated maximum stresses in the wheel.

Figure 4:
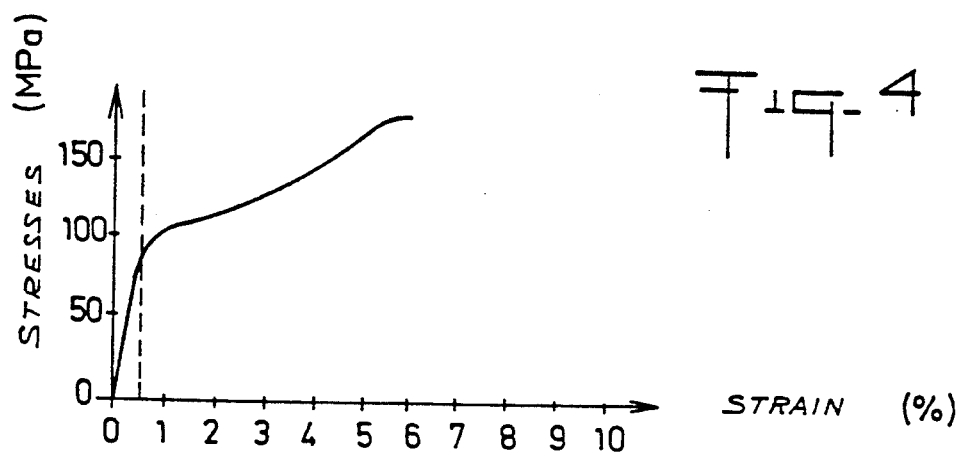
FIG. 4 shows a typical stress versus strain curve for a composite material comprising a refractory fiber reinforcement and a ceramic matrix.

Indeed, as is shown in FIG. 4, the tensile strength curve for such a material reveals a "plastic" phase, beyond the elastic phase (zone A), which is generally attributed to a micro-cracking of the matrix. This type of ceramic composite material therefore accommodates local over-stresses without fragile breakage or subsequent propagation of cracks to the rest of the wheel. Such materials make it possible to reduce circumferential stresses at the level of the bore by about 20 to 25%.

The tailoring of the fiber density to the stress values in the circumferential and radial directions is achieved by acting on the relative proportions of warp threads (circumferential threads) and weft threads (radial threads) between the inner and outer edges of the helical fabric (i.e. along a radius). In other words, the proportion of warp threads is greater than that of weft threads in areas where circumferential stresses exceed radial stresses, and vice-versa.

Figure 5:
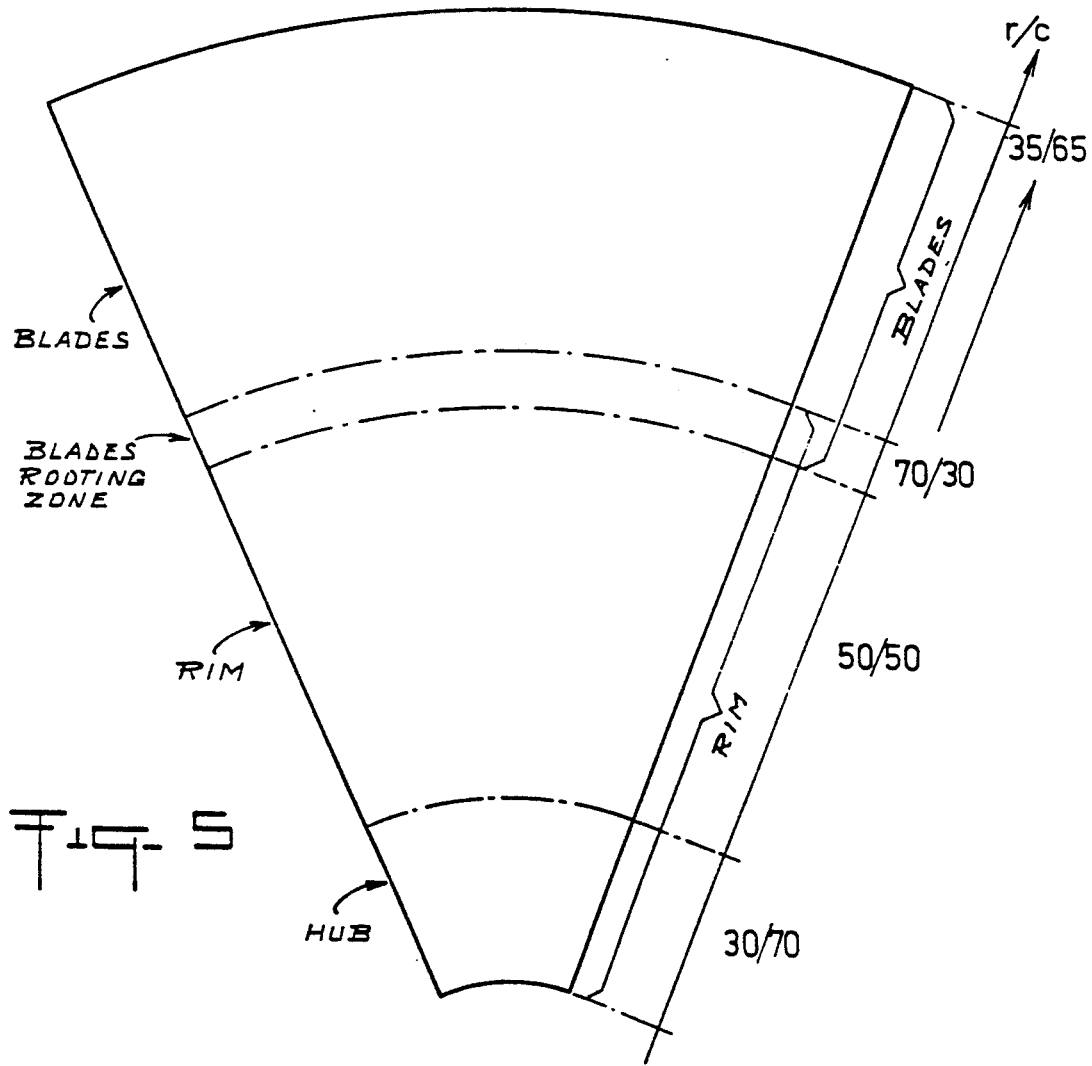
FIG. 5 shows the evolution of fiber density in the helical fabric along circumferential and radial directions, taking into account the stresses, whose variation is illustrated in FIG. 3.

FIG. 5, which shows a section of helical fabric, indicates how the ratio r/c evolves along a radius, where r is the relative proportion of radial threads and c is the relative proportion of circumferential threads. In a first zone corresponding to the hub portion of the rim, the ratio r/c is on average equal to 30/70, the stresses at that level being essentially in a circumferential direction. In a second zone, corresponding to the rest of the rim except for its peripheral portions where the blades are rooted, the ratio r/c is on average equal to 50/50. In a third zone, corresponding to part where the blades are rooted in the rim (the base of the blades), the ratio r/c is on average equal to 70/30, the stresses being essentially exerted in a radial direction. Finally, in a fourth zone corresponding to the blades outside the rim, the ratio r/c progresses from 70/30 to 33/66, this being naturally achieved with the use of radial threads that extend throughout the length of the blades, without returning in between (whence a gradual decrease in the radial thread density) and with regularly spaced circumferential threads (whence a substantially constant circumferential thread density). It will be understood that there is no sudden discontinuity in the ratio r/c when going from one zone to the other, the changes in this ratio being progressive.

The absolute values for fiber densities $t_r$ in a radial direction and fiber densities $t_c$ in a circumferential direction are chosen to provide the finished product with the mechanical resistance required to withstand the stresses exerted thereon. For instance, the density of circumferential fibers at the level of the inner diameter will be chosen to make the latter withstand the circumferential forces at that level. For the rest of the wheel, the density values $t_c$ and $t_r$ are chosen so that they satisfy the predetermined evolution of the ratio r/c. It should be ensured that there is a sufficient density of radial or circumferential fibers in the most exposed zones; to this end, there should at least be a minimum density of radial fibers at the blade root base to ensure good anchoring of the blades. What is meant here by fiber density for a zone, is the percentage of that zone occupied by the fibers.

According to another characteristic of the invention, the fibers are chosen so as to present properties adapted to the operating conditions of the wheel.

When the wheel is active, especially in a turbojet, it is exposed—particularly at its peripheral portion—to high temperatures and chemical attacks. Consequently, the radial fibers, which can extend up to the external radius, and the circumferential fibers in the part corresponding to the blades, are chosen to be at least partially made of a material that is above all capable of withstanding high temperatures and chemical attacks. One candidate material is silicon carbide, even though its mechanical characteristics are inferior to those of carbon threads. On the other hand, in the rim, where circumferential stresses are high but thermal and chemical attacks are less severe, the circumferential fibers are selected to be at least partially made of a material that is above all capable of withstanding high mechanical stresses, such as carbon, even though it does not resist so well to high temperatures and chemical attacks as silicon carbide. Therefore, the helical fabric is woven so that the warp fibers are made of e.g. carbon for the part corresponding to the rim, and silicon carbide for the part corresponding to the blades, while the weft threads are made of silicon carbide.

Once the wheel preform has been produced by tightening of the spirals of the helical fabric, as explained above, it is kept in shape impregnation with a fugitive resin so as to be machinable in view of obtaining a wheel blank. The latter is then introduced into a tool for densification by the material constituting the composite material matrix. Densification is preferably achieved by vapor-phase infiltration of the matrix material, which can be silicon carbide. Vapor phase infiltration of silicon carbide is a well known process, in particular described in document FR-A-2,401 888. The fugitive resin is in this case eliminated during the temperature rise prior to infiltration, with the blank held by the tool. When the densification is completed, the wheel is machined to its final dimensions.

What is claimed is:

1. A high-speed turbine wheel comprising:
   a central portion comprising a rim, blades provided at the periphery of the rim, the rim and blades being made of a single piece of composite material formed by a fibrous reinforcement densified by a matrix,
   wherein the reinforcement comprises a helical fabric with radially oriented fibers and circumferentially oriented fibers, with the ratio between the density of the radially oriented fibers and the density of the circumferentially oriented fibers increasing continuously along a radius of the wheel from a value lower than one in a hub portion of the rim adjacent the internal diameter of the rim, to a value higher than one in a blades rooting zone of the rim adjacent the external diameter of the rim, and then decreasing in said blades from said blades rooting zone to the extremities of the blades, whereby the densities of the radially oriented fibers and circumferentially oriented fibers vary along the radius of the wheel as a function of the variation of radial and circumferential stresses that are exerted on the wheel when in operation, and
   wherein at least part of the circumferentially oriented fibers in the rim are made of a material having substantial mechanical resistance, while at least part of the circumferentially oriented fibers in the blades and the radially oriented fibers are made of a material having substantial resistance to high temperature and chemical attacks.

2. A wheel as claimed in claim 1, wherein said at least part of the circumferentially oriented fibers in the rim are made of carbon.

3. A wheel as claimed in claim 1, wherein said at least part of the circumferentially oriented fibers in the blades and the radially oriented fibers are made of silicon carbide.

4. A wheel as claimed in claim 1, wherein the matrix is made of silicon carbide.

5. A high-speed turbine wheel comprising:
   a rim extending radially from an internal diameter to an external diameter, the rim having a hub portion adjacent the internal diameter of the rim and a blade rooting zone adjacent the external diameter of the rim;

blades extending from the blade rooting zone of the rim;

wherein the rim and blades are made of a single piece of composite material formed by a fibrous reinforcement densified by a matrix, the fibrous reinforcement comprising a helical fabric having radially oriented fibers and circumferentially oriented fibers, the radially oriented fibers having a radial fiber density and the circumferentially oriented fibers having a circumferential fiber density;

wherein the ratio between the radial fiber density and the circumferential fiber density increases continuously along the radius of the wheel from a value lower than one in the hub portion of the rim to a value greater than one in the blade rooting zone of the rim, and then decreases in the blades from the blade rooting zone to the extremities of the blades, such that the densities of the radially oriented fibers and circumferentially oriented fibers vary along the radius of the wheel as a function of the variation of radial and circumferential stresses that are exerted on the wheel when in operation, and wherein at least part of the circumferentially oriented fibers in the rim are made of a material having substantial mechanical resistance, and at least part of the circumferentially oriented fibers in the blades and the radially oriented fibers are made of a material having substantial resistance to high temperature and chemical attacks.

6. A high-speed turbine wheel comprising:

a rim extending radially from an internal diameter to an external diameter, the rim having a hub portion adjacent the internal diameter of the rim and a blade rooting zone adjacent the external diameter of the rim;

blades extending from the blade rooting zone of the rim;

wherein the rim and blades are made of a single piece of composite material formed by a fibrous reinforcement densified by a matrix, the fibrous reinforcement comprising a helical fabric having radially oriented fibers and circumferentially oriented fibers, the radially oriented fibers having a radial fiber density selectively variable along the radius of the wheel and the circumferentially oriented fibers having a circumferential fiber density selectively variable along the radius of the wheel;

wherein the ratio between the radial fiber density and the circumferential fiber density increases continuously along the radius of the wheel from the hub portion of the rim to a maximum in the blade rooting zone of the rim, and then decreases from the blade rooting zone to the extremities of the blades, and wherein at least part of the circumferentially oriented fibers in the rim are made of a material having substantial mechanical resistance, and at least part of the circumferentially oriented fibers in the blades and the radially oriented fibers are made of a material having substantial resistance to high temperature and chemical attacks.

* * * * *